Aug. 8, 1939.   C. F. BEELER   2,168,614
AIR CONDITIONING
Filed April 9, 1932   3 Sheets-Sheet 1

Inventor
Charles F. Beeler
By Maréchal & Noe
Attorney

Aug. 8, 1939.   C. F. BEELER   2,168,614
AIR CONDITIONING
Filed April 9, 1932   3 Sheets-Sheet 3

Inventor
Charles F. Beeler
By Maréchal & Noe
Attorney

Patented Aug. 8, 1939

2,168,614

UNITED STATES PATENT OFFICE 2,168,614

AIR CONDITIONING

Charles F. Beeler, Hamilton, Ohio

Application April 9, 1932, Serial No. 604,251

19 Claims. (Cl. 257—3)

This invention relates to air conditioning.

One of the principal objects of the invention is to provide a method of conditioning air for an enclosure to maintain desired conditions of temperature and humidity of the air within the enclosure in an expeditious and economical manner, utilizing primarily ventilative cooling and dehumidifying and/or evaporative cooling and minimizing the use of positive cooling and dehumidifying or heating.

Another object of the invention is to provide such a method in which outside fresh air is admitted into the enclosure in controlled and variable amount in accordance with temperature and humidity conditions of the outside fresh air, to thereby maintain desired air conditions within the enclosure with minimized use of positive heating and cooling, as well as minimized conditioning of outside air before introduction into the enclosure.

Another object is to provide such a method with variable fresh air introduction into the enclosure and exhaust of air from the enclosure, with minimized conditioning of fresh air, and separate recirculation of air within the enclosure with independent conditioning of the recirculated air.

Another object of the invention is to provide such a method with variable fresh air introduction into the enclosure in accordance with occupancy conditions within the enclosure.

Another object of the invention is to provide a method of conditioning air for a plurality of rooms of a building, with independent control of the temperature and humidity conditions in the various rooms, and in which air recirculated from one room is returned to that particular room and is prevented from passing to or mixing with air supplied to another room, except as may take place due to normal circulation through open doors and the like within the building.

Another object of the invention is to provide such a method in which the introduction of outside fresh air into the enclosure is controlled in accordance with the absolute humidity of the outside fresh air, or in accordance with a predetermined air condition within the range represented by a line on a psychrometric chart extending at an angle to wet bulb temperature lines and also at an angle to dry bulb temperature lines.

Still another object of the invention is to provide apparatus for carrying out the above method, which is efficient and automatic in operation, requires a minimum of attention and manual control, and which automatically takes care of air conditions within the enclosure throughout the year, irrespective of the varying temperature and humidity conditions of the outside air as may take place from one day to the next or in different seasons of the year.

Other objects and advantages of the invention will be apparent from the following description when taken in connection with the accompanying drawings and appended claims.

In the drawings, in which like characters of reference are used to designate like parts throughout the several views thereof—

The present invention is adapted for the air conditioning of various buildings and enclosures, such as factories, threatres, hotels, hospitals, office buildings, residential buildings, and the like, and is more economically applied to such buildings as are of a highly insulated or nearly airtight construction, although not limited to such application.

Figures 1, 2:
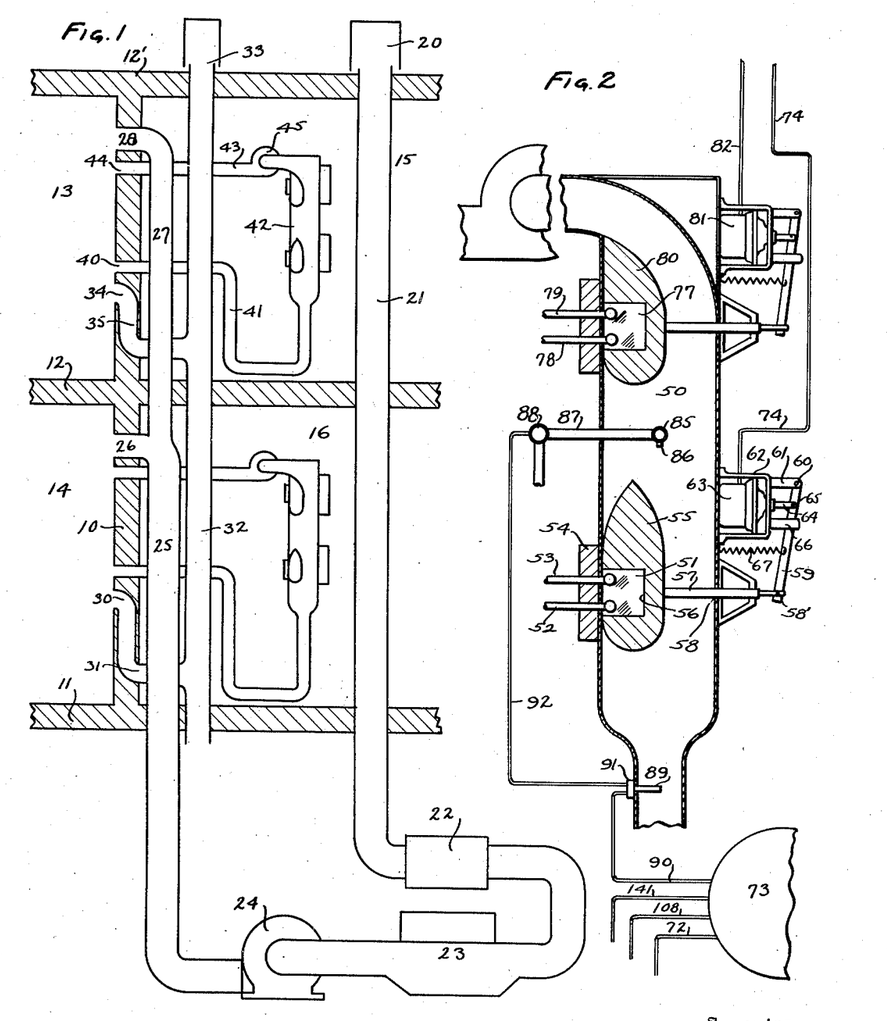
Fig. 1 is a diagrammatic view with parts in vertical section of a building provided with an air conditioning system constructed in accordance with the present invention.
Fig. 2 is an enlarged vertical sectional view of a room recirculating unit together with the controls therefor.

Referring to the drawings, in which are illustrated preferred embodiments of the present invention, Fig. 1 shows a section through a building such as described above, equipped with the air conditioning system of the present invention. A partition wall of the building is indicated at 10, and floors are shown at 11 and 12 with a roof at 12'. The partition wall 10 separates rooms 13 and 14 from chambers or passageways 15 and 16 in which a portion of the air conditioning system is mounted. It is, of course, to be understood that the location of the various parts of the air conditioning mechanism may be in various parts of the building depending on the particular construction thereof, and the present illustration merely indicates one embodiment which may be used in accordance with this invention.

A fresh air intake taking in outside atmospheric air is illustrated at 20, opening through the roof 12' of the building, although this intake could be at different elevations or locations if desired. A duct 21 leads the fresh air through suitable filters 22, which may be of entirely conventional construction, and are not particularly illustrated herein, and thence to a central air conditioning mechanism designated generally at 23, and which may be located within the basement or plant room of the building, or at any other suitable location. Fan 24, which may be a motor driven centrifugal fan operating at a constant speed and developing a small head, furnishes the motive power for drawing in fresh air through the intake 20, and supplying this air through duct 25 and intake opening 26 to room 14, and through duct 27 and intake opening 28 to room 13.

Room 14 is provided with an exhaust opening 30 connected by pipe 31 to a main exhaust duct 32 opening at 33 through roof 12 to the atmosphere. Room 13 is likewise provided with an exhaust opening 34 connected by pipe 35 with the main exhaust duct 32. A plenum system is illustrated, that is, one in which the pressure of air in the rooms is slightly greater than outside, and doors and windows of the building are normally kept closed. With such a system, operation of dampers within the exhaust openings of the rooms will exhaust a varying proportion of air to atmosphere, thereby increasing the proportion of fresh air drawn in by the fan 24. This effect can be obtained, if desired, by reducing the pressure in the waste exhaust by an auxiliary fan. Moreover, the fan 24 could be mounted in the waste exhaust duct, if desired, and the pressure within the rooms maintained slightly below atmospheric, the proportion of new air being thereby drawn in by the pressure differential existing between atmospheric pressure on the outside and a slight subatmospheric pressure on the interior. In either case, the final exhaust into atmosphere at 33 is maintained approximately at the same pressure as that existing at the intake 20. While only two rooms of a building have been shown for purposes of illustration, it is to be understood that the system is applicable to any number of rooms, or any number of groups of rooms, where each room of a group is supplied with fresh air from the common intake 21 through the common air conditioning mechanism 23, and each room is provided with a separate exhaust to atmosphere, which may or may not include a common exhaust passage as desired.

In accordance with the present invention, each room is provided with separate and independent air recirculation and conditioning. As shown, room 13 is provided with a recirculating exhaust opening 40 connected by pipe 41 to a conditioning chamber indicated generally at 42, which in turn is connected by a pipe 43 to a recirculating intake opening 44 for reintroducing the recirculated air back to the same room from which it was withdrawn. The recirculating passage for each room is provided with a fan 45, which may be a power driven centrifugal fan operating at a constant speed. The recirculation from each room is thus entirely independent of the recirculation from another room, and is independent of the rate of supply of fresh air or exhaust of air to atmosphere from each said room. A similar recirculating passage and conditioning mechanism is shown for the room 14.

Referring more particularly to Fig. 2, the conditioning mechanism 42 for the recirculated air of each room is shown mounted in an enlargement 50 of the recirculating passage. Positioned within this enlargement 50 is any suitable heating means, such as a heating coil 51 supplied with a heated medium such as steam through a pipe 52, waste steam being exhausted through pipe 53. It is to be understood that this heating means, if desired, could be located in the room itself, and could take the form of a usual radiator to which the heating medium is supplied under the control of the room thermostat. This coil may be supplied with steam under controlled temperature by a suitable boiler (not shown) as is well understood. The coil is preferably mounted on a heat insulating closure 54 mounted over a suitable opening in the pipe 50, through which the coil can be inserted. As thus illustrated, the heating coil is mounted directly within the recirculating air passage, and the heating effect on the recirculating air is controlled by a damper 55 also formed of heat insulating material such as asbestos, magnesia, or suitable moldable and heat insulating compositions of well known type. This damper is provided with a lower opening 56 adapted to snugly receive and encompass the heating coil in its lowermost position, and is adapted to be raised to expose all or a controlled portion of the heating coil to the recirculating air by means of a stem 57 slidably mounted through a packed opening 58 in the upper portion of the duct 50. The stem 57 is pivotally connected at 58' to a lever 59 pivotally mounted at 60 to an upstanding arm 61 carried by a housing 62 mounted on the duct 50. Housing 62 supports an expansible and contractible sylphon bellows 63, the lower portion of which is fastened to the bottom of the housing, and the upper portion of which is movably mounted within the housing and carries a rod 64 extending to the exterior thereof and pivotally connected at 65 to the lever 59. A guide or fork 66 is mounted on the housing 62 to guide the movements of the lever; and a spring 67, fastened at one end to the lever 59 and at the other end to the housing 62, constantly urges the insulated cover 55 toward closed position encompassing the heating coil.

Figures 3, 4, 5:
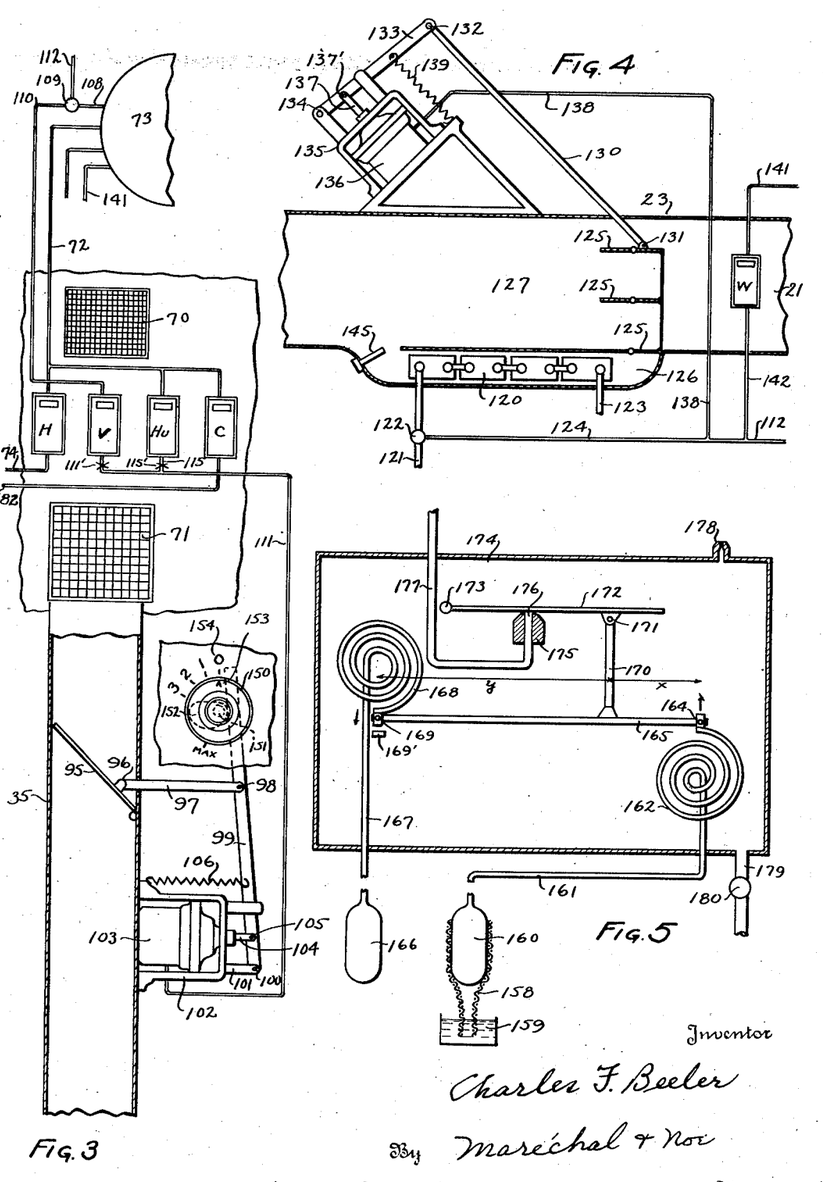
Fig. 3 is an enlarged elevational view of the recirculating and exhaust grills of a room together with controls therefor, showing the exhaust passage in section.
Fig. 4 is a vertical sectional view through the common fresh air intake for the various room units, together with the controls therefor.
Fig. 5 is a diagrammatic view of a combination wet bulb-dry bulb thermostat, constructed in accordance with the present invention.

Referring more particularly to Fig. 3, a grill 70 is mounted over the output 40 in the recirculating passage of the room, and a separate grill 71 is mounted over the exhaust outlet 34. These grills can be combined into a single grill of attractive appearance and design, if desired. Mounted on the wall of the room in any convenient location, such as adjacent the grills, are the thermostats and hygrostats which are responsive to conditions of air within the room. If desired, these can be mounted within the recirculating passage, such as in the outlet 40, so as to be hidden from sight, but are preferably mounted in an exposed position for eady access. Or, as may be preferable in certain installations, the sensitive element of the thermostat may be mounted in the air passage, and connected to actuate a valve at the leak port of the thermostat casing mounted on the room control panel. As shown, a thermostat H of conventional construction is connected by pipe 72 to a source of air under constant pressure, illustrated as the container 73. For example, this may be a container supplied by a motor driven compressor having a pressure control of well known construction so as to maintain a predetermined pressure of the air of about 15 pounds per square inch within the container 73. The thermostat H controls in a well known manner a valved opening which serves to supply the pressure air from pipe 72 to pipe 74 leading to bellows 63. This may be done by controlling a leak port in the wall of the casing of the thermostat H, which is larger in cross-sectional area than the inlet port from pipe 72 to the casing of the thermostat, so that when the temperature rises beyond a predetermined setting of the thermostat, the leak port is opened and the pressure within pipe 74 and bellows 63 falls to a point such as to enable the spring 67 to return the insulated cover 55 to position entirely enclosing the heating coil 51, and thus terminate the heating of the recirculated air for the room. While a pressure fluid control system is illustrated, it is to be understood that any other suitable control may be used, such as an electrical control.

Also mounted within the casing 50 of the recirculating passage is a cooling means of any suitable construction, such as a refrigerating coil 77. This may be supplied with refrigerant through pipe 78 from a motor driven compressor and evaporating unit of well known construction in the refrigerating art, which is provided with a thermostatic control so as to maintain the temperature of the refrigerating coil 77 within a desired range. Or the coil may be supplied with ice water from a controlled source of supply. The refrigerating fluid is returned from the coil 77 through pipe 79 to the compressor unit for reuse in the cycle, or where ice water is used may be exhausted from the system or recirculated through the ice tank. The coil 77 is also equipped with an insulating cover 80 similar to the cover 55, and is connected so as to be actuated by a bellows 81 in the manner peviously described for the cover 55. A thermostat C responsive to room temperature controls the passage of pressure fluid from pipe 72 to a pipe 82 leading to the diaphragm 81, in such a manner that as the temperature within the room rises above a predetemined setting of the thermostat C, the leak orifice of the thermostat is closed and pressure air is supplied through pipe 82 to the bellows 81, serving to raise the insulated cover 80 and expose the refrigerating coils to the recirculating air. In the case of ice water supply to the coil, the thermostat could be connected to actuate a valve in the supply line to the coil, instead of the insulated cover as shown. The insulated covers 55 and 80 are preferably provided with a stream lined exterior surface as shown, so as to minimize their resistance to the passage of air.

Also mounted within the casing 50 of the recirculating passage is a spray jet 85 having a series of nozzles 86 adapted to inject fine atomized sprays of water or steam into the recirculating air. This spray jet 85 is supplied through pipe 87 controlled by valve 88, which is preferably a pressure operated valve. Mounted within the recirculating passage, or within the room, is a hygrostat 89, which may be a wet bulb thermostat of well known construction. This hygrostat controls the passage of pressure air from the supply 73 through pipe 90 to casing 91 of the hygrostat, and thence through pipe 92 to valve 88. The hygrostat is set at the predetermined moisture content or humidity desired within the room at the predetermined temperature to be maintained, and functions to permit the passage of pressure air to the valve 88 to thereby open the valve and operate the spray jets when the humidity drops below the desired point. Preferably, cold water, such as ordinary tap water, is supplied to the spray jet 85, so that the introduction of the spray gives the double function of raising the humidity of the recirculated air to the desired point, and of cooling the recirculated air by evaporation.

Referring again to Fig. 3, the exhaust duct 35 from each room is provided with a damper 95 to thereby control the amount of air exhausted from each room, and consequently the amount of fresh air introduced into the room as previously described. Pivotally connected to the damper 95 at 96 is an arm 97 which is in turn pivotally connected at 98 to a lever 99 pivotally mounted at 100 to an arm 101 carried by housing 102 fastened to the wall or to the duct 35. Mounted within housing 102 is a bellows 103 which actuates an arm 104 pivotally connected at 105 to the lever 99. Expansion of the bellows 103 serves to rock the lever 99 and open damper 95 against the action of a spring 106.

Mounted on the control panel of the room is another thermostat V which controls the supply of pressure air from container 73 through pipe 108, valve 109, pipe 110 to the thermostat, and thence through pipe 111 to the bellows 103. Valve 109 is a pressure operated valve which is normally open except when pressure is supplied to the valve through pipe 112. The setting of thermostat V is such that as the temperature within the room rises above a predetermined point, the thermostat closes the leak port and allows pressure air to pass through pipe 111 to the bellows 103 to thereby open damper 95. This introduces larger amounts of fresh air from atmosphere into the room, and at the same time exhausts larger amounts of air from the room to atmosphere. If the temperature of the outside air, or the temperature of the fresh air being introduced, is less than the desired room temperature, this will result in a lowering of room temperature, and thermostat V will then operate to again open the leak port, causing damper 95 to be moved toward closed position to again reduce the amount of fresh air introduced into the room.

Also mounted on the control panel of the room is a hygrostat H$u$, which may be a conventional wet bulb thermostat, responsive to humidity conditions within the room. This hygrostat controls the supply of pressure air from pipe 72 to pipe 115 which is connected to pipe 111, and thus also controls the operation of bellows 103 and regulates the positioning of damper 95. The arrangement is such that as the humidity of the room air rises above a predetermined setting of the hygrostat H$u$, this hygrostat functions to supply pressure air from pipe 72 to pipe 115 and thence to the bellows 103 to move the damper 95 toward open position to admit larger quantities of fresh air to the room, this irrespective of whether the temperature within the room is below the predetermined setting of thermostat V so that this thermostat has not functioned. Where both the thermostat V and hygrostat H$u$ are functioning, the control element which has opened wider to supply the higher pressure to pipe 111 governs. For this purpose, check valves 111' and 115' are provided in the lines 111 and 115 respectively. Thus, if the thermostat V has partially opened to supply pressure air at 9# to line 111, whereas hygrostat Hu has only partially opened to supply pressure air under 6# pressure to line 115, the excess back pressure of 3# closes check valve 115', and the thermostat V then governs the actuation of damper 95. When conditions are reversed and hygrostat Hu is supplying the higher pressure, then check valve 111' closes, and hygrostat Hu governs the actuation of damper 95. When both thermostat V and hygrostat Hu are closed, damper 95 is automatically returned under the action of spring 106 to its minimum setting, which may be a fully closed or zero position.

It is to be understood that each of the thermostats and hygrostats can be selected to operate within a comparatively narrow temperature or humidity range, or within a larger range as desired. For example, each thermostat may be set to begin functioning at a predetermined degree, and to gradually increase or decrease the pressure within its associated bellows over a dry bulb or wet bulb temperature range of from one-half a degree to several degrees or more. In such event, considering the temperature within the room as having attained a degree at which the thermostat V has only started to function so as to build up a partial pressure within the bellows 103 and slightly open the damper 95, the hygrostat Hu can then come into operation and when its opening produces a pressure which exceeds the pressure resulting from operation of thermostat V, the control of the damper setting then automatically switches from thermostat V to hygrostat Hu. This provides a sensitive control, which serves to maintain room conditions within narrow and predetermined limits. Such thermostats and hygrostats functioning within narrow ranges are well known, and no detailed description of such devices is given here.

Due to the different desires, habits of dress, and physiological requirements of one or the few occupants of any room, it may be desired to maintain different conditions of temperature and humidity within the various rooms supplied by a common fresh air intake. The present invention enables the independent selection of the conditions of each room for the ensuing occupancy. Thus, the amount of fresh air supplied to the room and the air exhausted therefrom can be controlled independently of each of the other rooms by means of the thermostat V and the hygrostat Hu. The temperature of the air within each room can be independently controlled by the thermostats H and C. Inasmuch as a predetermined range of humidity may be provided, such for example as 63° to 65° wet bulb, and comfortable conditions maintained within the room irrespective of whether the occupant or occupants desire a temperature of 72° F. or a temperature of 60° F., a change from a predetermined humidity setting of the conditions within the room is not usually required. For this reason, the hygrostat 89 may be mounted out of access within the recirculating passage, and initially set for a predetermined relative humidity such as within the range above mentioned. The present invention provides for the ready selection of the individual room requirements as to temperature within the range allowed by the master thermostat in the air intake described below, by a simple manual adjustment of the thermostats H, V and C. Such thermostats provided with manually adjustable settings are well known and need no further description here.

The thermostats H, V and C are given settings in a predetermined order or sequence for any given temperature condition to be maintained within a room. Thus, for example, the thermostat H may be set to open the cover 55 to expose the heating coils at any temperature below 72° F., the thermostat V may be set to move the damper 95 toward opening position as the temperature within the room rises above 74° F., and the thermostat C may be set to open cover 80 to expose the cooling coils 77 at any temperature over 76° F. This serves to maintain the temperature within the room within narrow limits. However, should the temperature of the outside fresh air, or the humidity of the outside fresh air, be above that desired within the room, then a considerable load may be placed upon the refrigerating coils 77. And while coils 77 may be able to maintain the temperature, the humidity within the room may rise above the desired maximum, particularly where there are a number of occupants in a single room, thus giving a large humidity load. The present invention takes into consideration this contingency and provides for automatically regulating the conditions of the fresh air introduced into the room, as well as the amount of such fresh air, in accordance with the temperature and humidity conditions of the untreated outside atmospheric air.

Referring more particularly to Fig. 4, the fresh air duct 21 opens into the casing 23 of the common air conditioning mechanism which supplies duct 25 leading the fresh air to the various rooms. Mounted within casing 23 at one side of or below the passage thereof, is any suitable dehumidifying and cooling mechanism. As shown, this comprises a series of interconnected refrigerating coils 120 supplied with refrigerant by pipe 121 controlled by valve 122. Pipe 121 leads to a motor driven compressor and evaporator unit of well known construction, and the refrigerating medium is returned to this unit by pipe 123. Valve 122 is a pressure operated valve which is normally closed, except when pressure fluid is supplied to the valve casing by pipe 124. A series of interconnected dampers 125 are mounted within the casing 23 and control the flow of air through a passageway 126 over the refrigerating coils, and/or through a by-pass 127 around the refrigerating coils. The construction is such that as the dampers 125 move to close the by-pass 127, the passage 126 containing the refrigerating coils is opened, and vice versa. Dampers 125 are actuated by arm 130 pivotally connected to the dampers at 131, and also pivotally connected at 132 to a lever 133 pivotally mounted at 134 on housing 135 confining bellows 136. The latter carries a rod 137 pivotally connected at 137' to lever 133, so that as pressure fluid is supplied to bellows 136 by pipe 138 with resultant expansion of the bellows, lever 133 is raised against the action of spring 139 to move the dampers 125 toward position closing by-pass 127 and opening passage 126.

The dampers 125 may be controlled automatically by a master wet bulb thermostat W of conventional construction which is mounted within the duct 21 so as to be responsive to the temperature and humidity conditions of the untreated outside atmospheric air. The wet bulb thermostat W controls the passage of pressure fluid from container 73 through pipe 141 to a pipe 142, which is in turn connected to pipe 138 supplying bellows 136. Wet bulb thermostat W also controls the passage of pressure fluid to pipe 124, branched off of pipe 138, which serves to open valve 122 against the action of a suitable spring (not shown) and thus initiate the supply of refrigerant to the dehumidifying and cooling coils 120. The master wet bulb thermostat W is so set that as the wet bulb temperature of the untreated atmospheric air rises above a predetermined point which is insufficient to maintain a desired wet bulb temperature within the rooms, the thermostat functions to close the leak port of the thermostat casing, and thereby increase the pressure within bellows 136 so as to move dampers 125 toward position closing by-pass 127 and opening passage 126, and at the same time the increased pressure effective in pipe 124 opens valve 122 to supply refrigerating fluid to the coils 120.

Fresh air is thus introduced across the refrigerating coils and is cooled very materially, such as to a temperature of about 46° F., for example, and the air will generally be saturated with moisture at this temperature, the excess moisture being precipitated out due to the cooling. This effects dehumidification of the air as well as cooling. The refrigerant supplied to the coils 120 is preferably under the control of a thermostat which serves to maintain the coils and refrigerant at the proper low temperature irrespective of the quantity of air passed across these coils, so that a predetermined low temperature of the dehumidified and cooled air is maintained. For this purpose, a thermostat 145 is mounted within the casing 23 adjacent the end of air passage 126 so as to be directly responsive to the temperature of the dehumidified and cooled air. This thermostat controls the operation of the compressor and evaporative unit in a well known manner to vary the temperature of the refrigerating medium so as to maintain the desired temperature and dew point of the treated fresh air. While refrigerating coils have been illustrated and described as the dehumidifying and cooling mechanism, it is of course to be understood that other suitable types of mechanism can be used for this purpose. Thus, water sprays can be utilized to treat the incoming fresh air, the temperature of the sprayed water being controlled in a well known manner so as to cool the air to the desired degree and at the same time saturate it with water vapor at this temperature, the excess moisture being removed from the treated air by suitable baffles. Also, beds of silica gel can be utilized as a dehumidifying medium, passage of the air through the beds resulting in removal of moisture and reduction of the humidity as is well understood. Or suitable combinations of silica gel beds and refrigerating coils or dehumidifying and cooling sprays can be utilized.

When the temperature or moisture content of the outside atmospheric air exceeds that of room conditions to be maintained, and the dehumidifying and cooling mechanism in the common fresh air intake is brought into operation as described above, this of course involves a more expensive operation of positive cooling of the incoming fresh air. Moreover, this condition very likely will result in normal summer weather upon a rising outside temperature, and at a time when the thermostat V has actuated the damper 95 so as to draw in a larger proportion of outside fresh air in an effort to maintain the desired temperature within the room by ventilative cooling (this of course being feasible when the outside atmospheric temperature is somewhat below that desired in the room). But when the outside temperature rises still further, and the master wet bulb thermostat W has brought the dehumidifying and cooling unit into operation, then in the interests of economy it is desirable to utilize as little fresh air as possible in the maintenance of the proper room conditions. This is accomplished in accordance with the present invention by providing an interconnection between the master thermostat W and the control for the damper 95 which regulates the amount of fresh air introduced into each room. As shown, the pipe connection 112 is tapped off of the fluid pressure pipe 124, so that as the thermostat W functions to close the leak port within its casing and build up pressure within the bellows 136 and within valve 122 to supply refrigerating medium to the coils 120, pressure at the same time will be built up in pipe 112 which communicates with valve 109 to thereby close this valve 109. This cuts off the supply of pressure fluid to thermostat V, locking this thermostat in off position, and enabling spring 106 to move damper 95 toward closing position (see Fig. 3).

A common valve 109 may be provided, from which a plurality of pipe lines 110, one for each room, lead to thermostats V located in the several rooms. The master thermostat W thereby controls through valve 109 the dampers 95 for each of the rooms. Although the thermostat V is locked in closed position, the hygrostat $Hu$ is still in communication with the source of pressure air through pipe 72, and should the humidity within the room rise above the desired normal, pressure fluid will be supplied to bellows 103 to effect movement of damper 95 toward opening position, to thereby introduce a larger proportion of dehumidified and cooled fresh air to compensate for the humidity load.

A certain amount of ventilation is desirable in any event for a room which has one or more occupants. Moreover, the greater the occupancy of a room, the larger the proportion of ventilation or fresh air which should be admitted into that room to compensate for the additional humidity load. The automatic control including the hygrostat $Hu$ will accomplish this according to its setting. It frequently happens, however, that it is desirable to ventilate a room rapidly to get rid of smoke or gases; or an occupant at times may individually desire a greater ventilation than that afforded by the automatic control which just balances approximately the interior humidity load. In order to provide varying amounts of ventilation, with some slight reduction in efficiency of the system from that resulting from the automatic control, there is provided in accordance with the present invention a manual control which affords regulation or variation of the minimum setting of the damper 95 of each room, the control for one room being independent of that for another room. As shown, a manual control knob 150 is mounted on the control panel for each room, this control knob being fastened to a shaft 151 which carries a cam 152, against which the extended end of lever 99 rests. The knob 150 has an indicating line or mark, such as the arrow 153, which cooperates with suitable indicia 154 located on the control panel about the knob. The cam contour may be so correlated with the positioning of the indicia as to afford a predetermined minimum opening of the damper 95 for a room, so as to give a predetermined ventilation which increases with the manual setting of the dial irrespective of the automatic control. Thus, as shown, the indicia may be in the form of the numbers "0", "1", "2", "3", etc., which indicate the setting of the control knob for varying positions of the minimum setting of the damper, which may be in accordance with the number of people within the room, corresponding to the number, or a multiple of that number, on the control panel.

When there is no occupant in a room, ventilation is unnecessary. The knob 150 may be set with the arrow 153 pointing toward numeral 0, at which time the cam has been moved so as to permit lever 99 to rock under the action of spring 106 to close damper 95 completely. No outside fresh air will then be introduced into the room, when there is no humidity load in that room, so that there will be no wasteful expenditure of energy in dehumidifying and cooling outside fresh air for introduction into a room which is unoccupied. Should the room then be occupied by one or more people, the manual control knob 150 can be adjusted accordingly to determine the minimum setting of damper 95, so as to maintain this damper partially open even though pressure fluid is not supplied to bellows 103, to thereby give a predetermined minimum amount of ventilation. Should a room be filled with smoke or obnoxious gases, the control knob can be turned to the point marked "maximum", at which time the cam 152 will hold lever 99 in position against the action of spring 106, so that the damper 95 is in a partially or fully open position, depending upon the design of the cam. This will afford a rapid ventilation and purification of the air within the room, irrespective of the temperature and humidity conditions. When the smoke has cleared from the room, the control knob can then be returned to the desired setting, depending upon the desire of the occupant of the room. This affords an independent manual control of the ventilation of each room, and does not affect the operation of the automatic controls for the damper 95 except to determine the minimum setting of that damper and to prevent the damper from completely closing at times when the automatic control would afford this condition.

Operation of the air conditioning system is thought apparent from the preceding description; but will be additionally described for certain typical conditions of outside atmospheric air. As an aid in the understanding of the operation of the system, reference is made to the psychrometric chart shown in Fig. 6. By way of example, let it be assumed that it is desired to maintain within a room a dry bulb temperature between 72° F. and 76° F., and a humidity condition for that temperature range varying between 63° wet bulb and 65° wet bulb. This is a typical setting when the outside atmospheric air is comparatively cool. In extreme summer weather, when outside temperature may be above 85° or 90°, the inside temperature range may be set higher, such for example as from 78° to 82°, with greater economy in operation of the system, while still maintaining comfortable air conditions for occupants of the enclosure. This flexibility of control for different seasons of the year is readily provided by adjustments of the settings of the thermostats in well known manner. Assuming the outside atmospheric air is at 60° dry bulb temperature and 50% relative humidity, which is approximately 50° wet bulb, the master wet bulb thermostat W, which in such case would be set to function at about 62° wet bulb, would be in position leaving the leak port of the thermostat open, so that by-pass 126 would be closed and no refrigerating medium would be supplied to the coils 120. Any fresh air which is admitted through the common intake would then pass through the by-pass 127 around the conditioning mechanism.

Assuming a room to be at slightly less than 72° F. dry bulb and at 63° wet bulb, with thermostat H set to open at any temperature below 72° F. dry bulb, thermostat V set to function as the temperature rises to 74° F. dry bulb, and thermostat C set to function as the temperature rises to 76° F. dry bulb, thermostats V and C would then be inactive, so that the insulated cover 80 of the refrigerating coil 77 would be closed about this coil, and the damper 95 controlling the amount of fresh air introduced into the room would be at its minimum setting. The thermostat H would have functioned to wholly or partially lift the insulated cover 55 from the heating coils 51, so that the recirculated air from the room would be heated sufficiently to maintain the desired temperature of at least 72° F. Actually, the heating effect of the coil 51 would increase the temperature of room air somewhat above 72° F., and thermostat H would function to partially close the cover over the heating coils. The fresh air admitted due to the minimum setting of the damper would then tend to reduce the inside temperature somewhat, depending upon the interior heat load of lights, sensible heat given off from occupants, etc., and thermostat H would come back into operation as the room temperature again falls below 72° F., tending to increase the opening of the insulated cover. This cycle of operation providing a floating control would be repeated as long as the assumed conditions remain approximately the same, but the actual positive heating required would be reduced to the minimum which is essential to maintain room temperature with the required ventilation of comparatively cool outside air to compensate for occupancy.

As the humidity of the fresh air introduced is less than desired room humidity, the introduction of this fresh air would tend to reduce room humidity, but this would be wholly or in large part compensated by the humidity load of the occupants of the room. Any discrepancy or deficiency of room humidity will be taken care of by the hygrostat 89 in the recirculating passage opening valve 88 to supply moisture from the spray jets 86 to the recirculating air. If, for any reason, the humidity load of the room should be greater, such as to more than offset the deficiency in moisture resulting from the introduction of fresh air of reduced moisture content, then as the humidity within the room rises above 65° wet bulb, the hygrostat Hu will come into action to open damper 95 to a greater extent and admit larger quantities of fresh air which will thereby compensate for the extra humidity load. This will of course tend to reduce the room temperature, but this will in turn be compensated by lifting of damper 55 from the heating coils 51 so as to maintain the room temperature.

If, for any reason, there should be a greater interior heat load within the room, so that the room temperature rises above 74° F. dry bulb, then thermostat V will come into play to open damper 95 to a greater extent and thus admit larger volumes of the untreated outside fresh air so as to maintain room temperature. If the interior heat load should happen to be so large that the room temperature still continues to rise, even though thermostat V has opened damper 95 to its maximum extent, then when the room temperature exceeds 76° F., thermostat C will come into play to expose the refrigerating coils 77 and positively cool the recirculating air so as to maintain the desired range of room temperature. But the system automatically maintains the desired interior room conditions by a maximum of ventilative cooling and dehumidification under these circumstances, and the utilization of positive heating or cooling is cut down to a small and economical amount. Of course, under extreme winter weather, when the outside temperature is very low, then substantial positive heating by coil 51 is necessary to maintain interior temperatures with the required amount of ventilation; but this can substitute in whole or in large part the customary furnace heating of the enclosure.

Now if the outside atmospheric air conditions change to a dry bulb temperature of 68° F. and to about 73% relative humidity, which is equivalent to about 62° wet bulb, the system will automatically respond as follows: The interior temperature of the room will tend to rise, due to the interior heat load of occupants, etc., and the smaller difference between the outside temperature and the desired inside temperature. Under such condition, room temperature will rise above 74° F., and thermostat V will come into operation to open damper 95 beyond its minimum setting to afford a larger proportion of ventilative cooling. If a wide open position of damper 95 is insufficient to maintain room temperature, which nevertheless rises to 76° F., thermostat C will then come into operation to open the cooling coils 77 and positively cool the recirculating air. Master hygrostat W has not yet functioned, as the wet bulb temperature is still below its predetermined setting; but the quantity of fresh air introduced will compensate for the interior humidity load.

If the outside temperature continues to rise, say to 75° F. with a relative humidity of approximately 70%, which is equivalent to about 68° wet bulb, the master hygrostat W will have in the meantime functioned to close by-pass 127, open passageway 126 through the refrigerating coils 120, open valve 122 to supply refrigerating medium to these coils, and close valve 109 to lock thermostat V in off position to thereby permit damper 95 to move to its minimum setting under the action of spring 106. The positive cooling and dehumidification of the quantity of fresh air thus admitted to compensate for the occupancy load of the room will tend to maintain the interior temperature of the room within the desired temperature range, and likewise tend to maintain the humidity within the desired humidity range. This is due to the fact that the outside fresh air is positively cooled to about 42° wet bulb, which is also 42° F. dry bulb, as the air is saturated at this temperature. The temperature and moisture differential between the desired conditions of room air and the treated fresh air are sufficiently great to maintain the interior room conditions, although only a small proportion of fresh air is admitted into each room as determined by the minimum setting of damper 95 under the control of knob 150. Any small discrepancy in interior room conditions will be compensated for by the automatic controls including thermostats H, V and C, the hygrostat Hu, and the hygrostat 89, in the manner previously described.

The air conditioning system is thereby rendered automatically responsive to the condition of the outside atmospheric air, so that when the outside atmospheric air is below the desired wet bulb temperature of interior room conditions, it operates to introduce this outside air in untreated condition and in an amount which serves to automatically maintain proper interior conditions in substantial entirety or in major part by ventilative cooling and dehumidification. And, on the other hand, when the outside atmospheric air is above a predetermined wet bulb temperature, the system functions automatically to limit the amount of outside fresh air introduced to a predetermined minimum depending on the setting of the occupancy control, and to automatically bring into operation the positive dehumidifying and cooling unit in the common fresh air intake so as to condition this fresh air to such a state that its admission into the various rooms in the predetermined small amounts will serve in substantial entirety or in major part to maintain the desired interior air conditions.

Now consider the rather unusual atmospheric condition where the dry bulb temperature is 77° F. with relative humidity 40%, equivalent to a wet bulb temperature of 61°. The master hygrostat W has not functioned at this time, although the dry bulb temperature is above that to be maintained within the room, and the thermostat V has opened damper 95 to draw in larger proportions of outside fresh air. Under these circumstances, the larger proportions of outside fresh air of lower moisture content will reduce the effective moisture content within the room, and hygrostat 89 will operate to open the valve 88 to inject a substantial amount of cooling water through the jets 86 into the recirculated air. This will afford a substantial amount of evaporative cooling as well as humidification, which will tend in large part to maintain the desired temperature as well as humidity within the room. Any excess of temperature will be taken care of by the thermostat C opening the damper 80 to uncover the refrigerating coils 77 in the recirculating passage. It is thus seen that the system will automatically take care of this condition and maintain room conditions primarily by ventilation and by evaporative cooling, with only a minor amount of positive cooling to correct any discrepancy in temperature conditions.

The system is thus designed to automatically utilize the cooling and dehumidifying effect of outside atmospheric air to maintain in large part the predetermined interior conditions of temperature and humidity, avoiding wasteful expenditure of energy in dehumidification followed by back-heating of fresh air introduced into the system, and avoiding wasteful expenditure of energy in positive heating or cooling of recirculated air. The system automatically utilizes, when outside air conditions are available, a major amount of evaporative cooling and humidification, and a minimum amount of positive cooling to maintain the desired interior air conditions. Fresh air is supplied to each room from a common source in an economical and controlled amount without preconditioning, when outside atmospheric air conditions having temperature and humidity below that desired within the room are available; and the preconditioning of outside air is automatically initiated and at the same time the amount of fresh air introduced is limited to an economical amount, when temperature and humidity conditions of the outside air rise above the predetermined room conditions to be maintained. An independent automatic control of the temperature range within each room of a group is afforded together with an independent manual control to regulate the minimum amount of ventilation for each room in accordance with occupancy conditions. Air recirculated from each room is maintained entirely separate from that recirculated from another room, and is conditioned independently from the recirculated air of another room, as well as independently from the preconditioning of the common fresh air supply.

Figure 6:
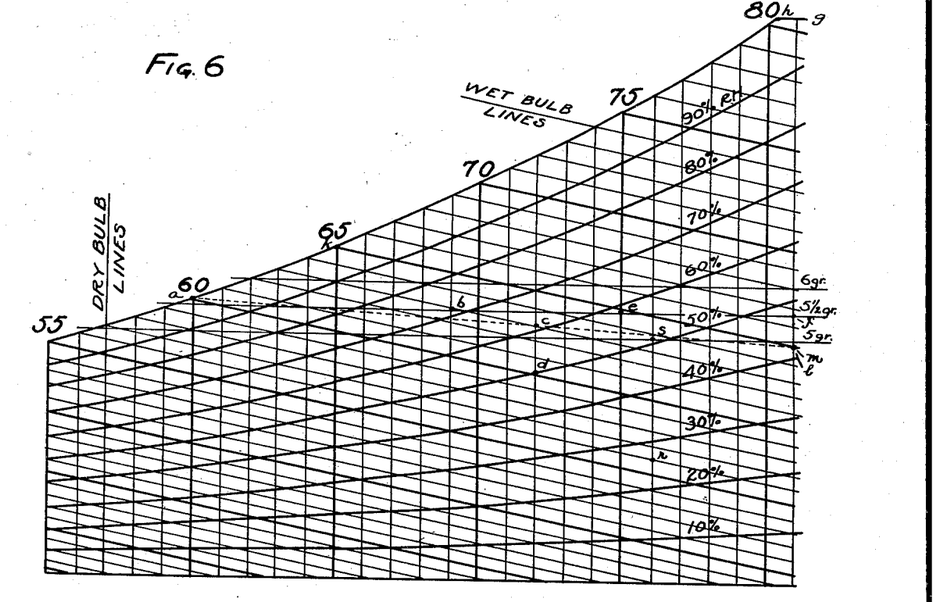
Fig. 6 is a view illustrating a psychrometric chart showing the operation of the present system.

The system described above is dependent upon a master wet bulb thermostat W responsive to the wet bulb temperature of untreated outside atmospheric air. This means that the master hygrostat W functions along some predetermined wet bulb temperature, as indicated for example, by the wet bulb line 63 on the psychrometric chart. Thus within a dry bulb temperature range from 72° to 76° F., the total absolute moisture content of the air at 63° wet bulb will vary from approximately 5¼ grains per cu. ft. at 72° F. to approximately 4¾ grains at 76° F. With small temperature ranges, the variation in absolute moisture content is insignificant; but with large temperature ranges, such as are experienced in normal atmospheric variations to which the master thermostat W is responsive, the variation in actual total moisture content along any predetermined wet bulb line is substantial. In order to most efficiently supply a room with the proper moisture content by means of a fresh air supply, it is desirable to effect control of the master thermostat in the fresh air intake, in accordance with the absolute moisture content or absolute humidity of the outside air.

For example, consider the atmospheric condition which frequently occurs in temperate climates in late spring, summer, or early fall, particularly early in the morning, when the dry bulb temperature is 66° F. with relative humidity approximately 80%, or equivalent to a wet bulb temperature of about 62°. The absolute humidity of the air under this condition is approximately 5½ grains. The master hygrostat W will not have functioned, because the wet bulb temperature is below the predetermined setting of this stat. However, the absolute moisture content of this air, about 5½ grains, is substantially the maximum which should be present in the room to maintain predetermined humidity conditions. If there is any additional humidity load within the room, such as that resulting from occupancy, admission of even large quantities of this atmospheric air in untreated condition will not reduce the humidity of the room to the desired maximum. This means that the fresh air admitted to the room should be preconditioned or dehumidified. To make the master stat highly efficient, it should initiate dehumidification at some fixed absolute moisture content of the outside air defined by a given differential in grains per cu. ft. between desired room air and the outside air, so that the maximum volume of air that it is desired to use by ventilation will substantially take care of the maximum humidity load to be encountered within the room. A differential of approximately ½ grain to 1 grain will generally be sufficient for this purpose in rooms containing few occupants. Of course, auditoriums or theatres should have a larger differential in view of the very large humidity load when such enclosures are filled with people. By selecting a predetermined absolute humidity, such for example, as 5 grains per cu. ft., a condition of absolute humidity of about 5½ grains may be maintained within a room containing relatively few people, by the present system.

So far as I am aware, available instruments, such as wet bulb and dry bulb thermostats or hygrostats, do not function in accordance with absolute humidity conditions. And the use of available instruments for the control of the fresh air intake results in a certain loss of economy or efficiency which otherwise might be secured. Thus, if the master hygrostat W is set to function at a lower wet bulb temperature, such for example, as 60° wet bulb, in order to take care of the atmospheric condition described immediately above, and if the required differential with the volume of fresh air employed is ½ grain per cu. ft. (that is, from 5½ grains absolute moisture content to 6 grains) the polygonal area on the psychrometric chart, designated "a, b, c, d" represents atmospheric conditions in which the dehumidifier is being wastefully employed, that is, sufficient outside air could accomplish the same result by ventilative cooling and dehumidification. And as has been previously described, if a higher outside wet bulb is chosen as the actuating condition, such as 63° wet bulb, then the system can not maintain itself within the maximum relative humidity under certain atmospheric conditions.

In accordance with the present invention, the control of the fresh air supply may be effected in accordance with the absolute humidity of the outside fresh air, or in accordance with a predetermined condition within the range represented by a line on a psychrometric chart extending at an angle to wet bulb temperature lines and also at an angle to dry bulb temperature lines.

In Fig. 5 is illustrated a combination wet bulb-dry bulb thermostat of the present invention providing a control in accordance with absolute humidity or such other predetermined condition. As shown, an ordinary wet bulb thermostat 160, which may be of the conventional wick and aspirating type and containing an actuating medium such as mercury, or volatile liquid such as carbon tetrachloride, is connected by a fine bore tube 161 to a coil 162 also having a fine bore, or other movable member responsive to the fluid expansion. The bulb is maintained moist in well known manner by a wick 158 drawing water by capillarity from a container 159, and the current of atmospheric air flowing through the fresh air intake 21 is directed over the bulb and wick. Rising wet bulb temperature causes an expansion of the fluid in bulb 160 producing a corresponding pressure increase through tube 161 and in spiral flexible coil 162 with resultant expansion of the end of the coil, such expansion producing upward movement of the end of the coil, in the direction of the arrow, as is well understood. The closed end of the coil is pivotally connected at 164 to a floating bar 165. A dry bulb instrument 166 is connected by a fine tube 167 to a corresponding spiral flexible coil 168, expansion of the latter coil on a rising dry bulb temperature producing movement of the coil end downwardly in the direction of the arrow. The closed end of coil 168 is pivotally connected at 169 to floating bar 165, this bar thus being movably supported by the expansible ends of coils 164 and 168. Floating bar 165 is rigidly connected to arm 170 which is in turn pivotally connected at 171 to a valve strip or member 172 pivoted at 173 to a portion of the frame or housing 174 of the device. The housing also supports the coils 162 and 168, and the bulbs 160 and 166 although these preferably project to the exterior of the closed housing so that the sensitive elements are exposed directly to the fresh air flowing through the intake 21. A pressure fluid supply member for introducing pressure fluid into the interior of housing 174 is indicated at 175 having a discharge orifice 176 which is adapted to be controlled by the valve element 172, the member 175 being connected by pipe 177 with a source of fluid under constant pressure such as the container 73. The housing 174 is also provided with a usual leak port 178 of small cross-sectional area relative to that of the orifice 176, so that when the orifice 176 is wholly or partially opened pressure is built up within the housing, whereas when the orifice is closed by valve member 172 the pressure within the housing is dissipated through the leak port 178. Pressure built up within the housing is communicated through pipe 179 to the bellows which actuates the dampers 125, and also to valve 122 to control the supply of refrigerating medium to the dehumidifying coils 120 as previously described.

It is to be understood that this combined wet bulb-dry bulb thermostat is substituted for the wet bulb thermostat W in the system as previously set forth. Within the pipe line 179 is a pressure operated valve 180 which is normally closed, as by spring pressure when the fluid pressure in housing 176 is below 15 pounds, and opens when the pressure rises to 15 pounds.

It will be noted that the pivotal connections 164 and 169 of coils 162 and 168 respectively are at opposite sides of the connection of the arm 170, but are of unequal distances from the connection of arm 170 to the floating bar 165. The effective lever arm of the wet bulb coil 162 is indicated at $x$, and the effective lever arm of the connection of the dry bulb coil 168 is indicated at $y$. It will further be noted that the coil 168 acts downwardly toward closing position of the valve member 172 upon a rising dry bulb temperature, whereas the coil 162 acts upwardly toward position for opening the valve member 172 upon a rising wet bulb temperature. The construction illustrated, with the proportions of the effective lever arms $x$ and $y$ as shown, is designed to function in accordance with absolute humidity, in other words, along an absolute moisture content line such as the 5½ grain line on the chart.

The proportions of the effective lever arms and their interconnections so as to act oppositely upon rising dry bulb and wet bulb temperatures respectively, are deduced as follows: Starting at the 5 grain line at 56° dry bulb, which is also 56° wet bulb, if the wet bulb coil 162 alone affected the valve member 172, then the instrument would function along the 56° wet bulb line. Upon a rising dry bulb temperature from 56° F. to 76° F., the 56° wet bulb line drops below the 5 grain line the distance $r$—$s$ as indicated on the chart. Therefore, it is seen with rising dry bulb temperature, the wet bulb thermostat will effect opening of valve 172 at progressively decreasing absolute moisture content. The point $s$ is at approximately 64° wet bulb whereas the point $r$ is at 56° wet bulb. Therefore it is seen that the correction needed to bring the instrument back to the 5 grain line is substantially 8° wet bulb in a dry bulb temperature range of 20°, giving a ratio of approximately 1 to 2½. In order to correct for this, the dry bulb thermostat coil 168 is connected to act in the opposite direction, so that the differential of the movements of the two coils is effective upon the valve member 172. By constructing the lengths of the lever arms $x$ and $y$ in the proportions of 1 to 2½ respectively, then the correction automatically provided by the dry bulb thermostatic coil 168 will just compensate for the tendency of the wet bulb thermostatic coil 162 to drop below the 5½ grain line. This is of course assuming that coils 162 and 168 are substantially identical and respond equal amounts for equal temperature variations. Thus with a 1° temperature variation, the end of coil 162 at the pivot point 164 will move the same distance as the pivot point 169 at the end of coil 168 moves in the opposite direction. However, due to the connection of arm 170 closer to the pivot point 164 than to the pivot point 169, the movement of coil 162 effects a greater movement of the valve member 172 than does movement of the coil 168. By constructing the lever arms $x$ and $y$ in the ratio of about 1 to 2½ opening of valve 172 will take place substantially along any given absolute humidity line. Additional contraction of the wet bulb 162 for falling wet bulb temperature beyond the closing position of valve 172 is permitted by constructing the valve 172 of thin spring metal, the end of which can flex after the valve has fully closed over the orifice 176. Or the valve member 172 can be spring pressed toward closing position, and arm 170 arranged to move in suitable guides to contact with the valve member on rising movement of the arm to open the valve, and move away from the valve member on lowering movement of the arm and after the valve is fully closed, the arm 170 being otherwise unconnected with valve member 172.

By altering the proportions of the effective lever arms $x$ and $y$, the action of the combined wet bulb-dry bulb thermostat can be made to follow any given line on the psychrometric chart which runs at an angle with respect to a given wet bulb line, and above the given wet bulb line to the right of their point of intersection. For example, with some installations, it may be desirable to provide a control which is responsive to a progressively decreasing absolute moisture content as the dry bulb temperature rises, which is represented by a line on a psychrometric chart which is at an angle to a wet bulb temperature line, and also at an angle to an absolute humidity line. In such event, the lever arm $y$ is constructed of a greater length relative to the length of the lever arm $x$, so that the corrective influence of the dry bulb thermostatic coil 168 is less than in the example given above. The line $a$—$m$ on the chart indicates the effective control line where the proportions of the lever arms $x$ and $y$ are in the ratio of 1 to 4, the valve being opened at the 5½ grain line at approximately 60° dry bulb, and being opened at about the 5 grain line at approximately 77° dry bulb. By connecting the dry bulb temperature coil 168 to the floating bar 165 so as to operate in the same direction as the wet bulb coil 162 upon a temperature rise, and by properly proportioning the effective lever arms of their respective connections to the floating bar, the combined wet bulb-dry bulb thermostat can be made to follow any given line on the psychrometric chart which is at an angle with respect to a given wet bulb line and below the given wet bulb line to the right of their point of intersection. Thus, in accordance with the present invention, a combined wet bulb-dry bulb thermostat is provided which can operate along any given line on the psychrometric chart which is at an angle to a wet bulb line along which a wet bulb thermostat operates, and which is at an angle to a dry bulb line along which a dry bulb thermostat operates, providing a control over any desired intermediate range.

Further, in accordance with the present invention, the combined wet bulb-dry bulb thermostat can be constructed to operate along any given absolute humidity line or any given "angle" line for a portion of its range of operation, and then operate for the balance of the range along a given wet bulb line or a given dry bulb line. For example, assume it is desired to operate along the 5½ grain absolute humidity line from 60° dry bulb to 75° dry bulb, and then to follow down the 65° wet bulb line, as indicated at a—e—l on the chart. This is accomplished by constructing the combined thermostat with the lever arms x and y in the proportion of approximately 1 to 2½ and operating in opposite directions, as described above for a combined thermostat which follows an absolute humidity line. In addition, a stop 169' is placed in the path of expanding movement of the pivot point 169 of the dry bulb expansion coil on rising dry bulb temperature. The stop 169' is so located that pivot 169 just contacts therewith as the dry bulb temperature rises to 75°, and additional expanding movement of pivot 169 on further rise in temperature is positively prevented, such additional expansion being taken up in deformation of the coil 168. This results in making movement of valve 172 solely responsive to movements of wet bulb coil 162 at all dry bulb temperatures over 75°, so that the thermostat will then actuate along the wet bulb temperature line which corresponds to 75° dry bulb at 5½ grains, or the 65° wet bulb line. Thus at all temperatures below 75° dry bulb, both the dry bulb coil and the wet bulb coil are influencing the movement of the valve member, to produce by their differential movements a control along the 5½ grain absolute humidity line; while above 75° dry bulb, the dry bulb coil has been rendered inoperative to effect such differential control, and the wet bulb coil then gives a control along the 65° wet bulb line. Thus, by providing suitably positioned stops in the paths of movement of the pivot points 169 and 164, either the dry bulb or the wet bulb may be rendered inoperative to affect the valve movement at either end of the range; and the combined thermostat can be constructed to follow a given absolute humidity line or a given "angle" line for a portion of the range, and then to follow a given wet bulb temperature line or a given dry bulb temperature line for the balance of the range. This affords an automatic control adaptable to certain specialized uses.

Again referring to the psychrometric chart, with the combined wet bulb-dry bulb thermostat constructed to function in accordance with absolute humidity along the 5½ grain line, all conditions of atmospheric air above the 5½ grain line and above the 65° wet bulb line, indicated at e, f, g, h, k will be dehumidified and cooled or heated. This is effected by the master combined wet bulb-dry bulb thermostat, constructed as described above, initiating operation of the refrigerating coils for dehumidification and cooling, as well as controlling the dampers 95 for the amount of fresh preconditioned air supplied to the individual rooms; and any small back-heating that may be required is accomplished by the thermostats H opening the heating coils 51 in the recirculating passages. The air below 5½ grains and above 65° wet bulb, indicated by the area e, f, i, can be introduced into the room direct without preconditioning, where the recirculating duct would provide more or less cooling effect from the spray jet humidification, and any additional cooling necessary to maintain room conditions would be accomplished by the thermostats C opening the cooling coils 77 in the recirculating passages. Air to the right of 75° dry bulb and below 65° wet bulb will also be introduced into the room direct without preconditioning, and the humidification by spray jets 86 in the recirculating passages will provide substantial evaporative cooling tending to maintain the desired temperature as well as humidity. Air less than 75° dry bulb and below 65° wet bulb, but above the 5½ grain line, as indicated by the area a, e, k, will be dehumidified; and this could economically be carried out by passing such air through silica gel which would reduce the humidity with a raising of the temperature, so that back-heating is largely avoided. However, such air can be treated by the refrigerating coils or water sprays as described to dehumidify and cool, and then can be back-heated, inasmuch as the proportion of such air introduced is automatically limited to a small amount by this system.

Figure 7:
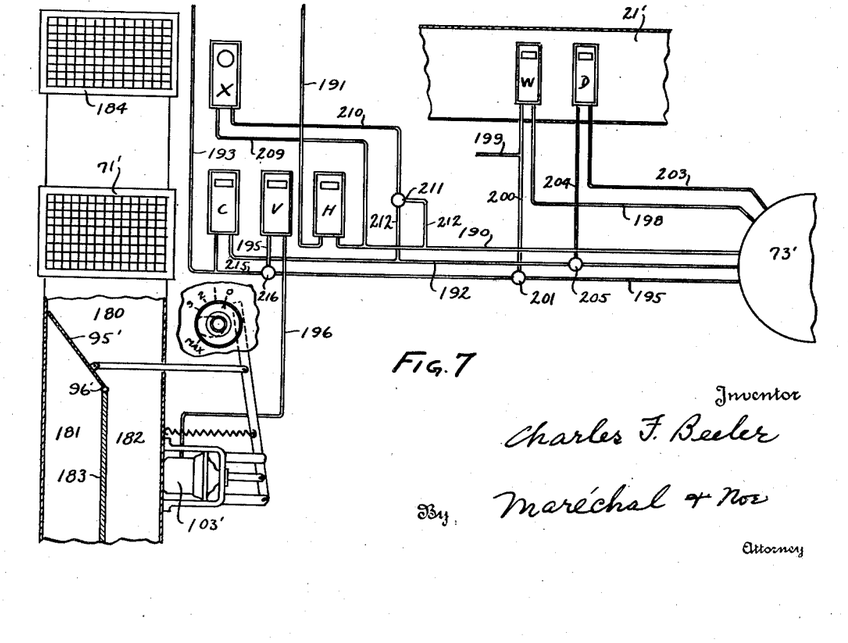
Fig. 7 is a view similar to Fig. 3 of a somewhat modified form of control.

In Fig. 7 is shown a somewhat modified form of room control for an air conditioning system of this character having a common fresh air supply for a plurality of rooms, with independent recirculation and conditioning of the recirculating supplies similar to that previously described. In this form, the exhaust grill 71' of the room communicates with a duct 180 divided into two branches 181 and 182 by the central partition 183. Duct 182 leads to the waste exhaust pipe which discharges to atmosphere, while duct 181 is a part of the recirculating system of the room, leading to the conditioning mechanism in the recirculating line as previously described and thence back to the supply grill shown at 184. The proportion of air exhausted to atmosphere from the room and consequently the proportion of fresh air admitted, is controlled by damper 95' pivoted at 96' to partition 183, and actuated by bellows 103' in the manner previously described. Bellows 103' is supplied with pressure fluid under the control of thermostat V as' previously described, whereas the heating coils and cooling coils within the recirculating duct are under the control of thermostats H and C respectively.

The common source of fluid pressure is indicated at 73', from which pipe 190 leads to thermostat H, and the pressure fluid supplied thereto is conveyed by pipe 191 to the bellows for lifting the insulated cover from the heating coils in the recirculating duct. Pipe 192 supplies pressure fluid to thermostat C, from which pipe 193 leads to the bellows for actuating the insulated cover for the cooling coils in the recirculating duct. Pipe 195 supplies pressure fluid to thermostat V, from which pipe 196 leads to the bellows 103' controlling the damper 95', regulating the amount of fresh air introduced into the room. In the intake 21' which leads fresh air from atmosphere to the dehumidifying and cooling mechanism in the common fresh air intake, as previously described, are positioned a wet bulb thermostat W and a dry bulb thermostat D. Wet bulb thermostat W controls the supply of pressure fluid from pipe 198 to pipe 199 which leads to the bellows regulating the dampers for controlling the supply of fresh air from 21' either across the refrigerating coils of the dehumidifying and cooling mechanism or through a by-pass around these coils in the manner of previously described; and also controls the supply of pressure fluid to a valve regulating the admission of refrigerating medium to the refrigerating coils in the manner previously described. A branch 200 is tapped off of pipe 199 and leads to a pressure operated valve 201 positioned within pipe line 195 which supplies pressure fluid to thermostat V. The valve 201 is normally open, except when wet bulb thermostat W opens to admit pressure fluid to line 199. The dry bulb thermostat D controls the supply of pressure fluid from pipe line 203 to line 204 which leads to a pressure operated valve 205 positioned within pipe line 192 which supplies pressure fluid to thermostat C. Valve 205 is normally open, except when the thermostat D functions to supply pressure fluid thereto through the line 204.

Mounted within the room is an additional dry bulb thermostat X to which pressure fluid is supplied by branch 209 tapped off of pipe line 190. This thermostat controls the supply of pressure fluid to a pipe line 210 leading to a pressure operated valve 211 positioned in a by-pass 212 providing communication between the source of pressure fluid 73' and the pipe line 192 on the far side of valve 205. As shown, the by-pass 212 leads from pipe 190 to pipe 192. Valve 211 is normally closed except when pressure fluid is supplied thereto through pipe line 210 under the control of thermostat X. A branch pipe 215 is tapped off of pipe 193 controlled by thermostat C, and leads to a pressure operated valve 216 in line 195 which supplies thermostat V. Valve 216 is normally open, except when pressure is supplied to line 193 and branch 215 which effects closing of this valve.

The operation of this system is as follows: Thermostats H, V and C may be set to function at 72° F., 74° F., and 76° F. respectively. Thermostat X may be set to function at 77° F. Wet bulb master hygrostat W may be set to function at 63° wet bulb. Dry bulb master thermostat D may be set to function at 72° F. When the outside temperature is below 63° wet bulb, master hygrostat W will be in off position, and valve 201 will be open; and when the outside temperature is below 72° F., master thermostat D will function to supply pressure fluid to close valve 205. Considering relatively low outside temperatures, such as about 50° F., the minimum proportion of outside fresh air introduced into the room under the control of the manual control knob 150', which regulates the minimum setting of damper 95' in the manner previously described, will cause room air to drop below 72° F. This will actuate thermostat H, bringing the heating coils in the recirculating passage into operation to bring the temperature of room air back to the predetermined normal.

As the outside temperature rises, the interior heat load will tend to balance the effect of the introduction of the colder outside air, until finally a room temperature of 72° F. will be maintained without the use of the heating coils in the recirculating passage, and thermostat H will remain closed. Upon a further rise of outside temperature, say to about 68° F., the interior heat load may exceed the cooling effect of the minimum quantity of outside fresh air introduced, and room temperature will gradually rise. As the room temperature comes up to 74° F., thermostat V will function to actuate bellows 103' to open damper 95' to admit larger quantities of outside fresh air, so as to automatically maintain the heat balance by ventilating cooling.

As outside temperature continues to rise, say to 73° F., maximum opening of damper 95' to give the maximum admission of fresh air may be insufficient to maintain room temperature, due to the interior heat load. Room temperature will then rise to 76° F. when thermostat C will function to supply pressure air to pipe 193 to open the cooling coils in the recirculating passage, and at the same time to supply pressure air through branch 215, tapped off of pipe 193, to pressure operated valve 216 positioned within pipe line 195 leading pressure air to thermostat V. Consequently, as soon as the cooling coils in the recirculating passage come into operation, the thermostat V is thrown out of operation so as to permit damper 95' to return to its minimum setting, so as to introduce only the minimum amount of outside fresh air required for ventilation, and to avoid introducing larger quantities of this outside air which is now incapable of maintaining the desired interior room temperatures. When the outside temperature rose to 72° F., master thermostat D functioned to shut off the supply of pressure air to pipe line 204, so as to enable valve 205 to open, to thereby supply pressure fluid to thermostat C which generally functions shortly thereafter.

Then, as outside temperature falls below 72° F., such as to 70° F., master thermostat D will open to supply pressure fluid through pipe line 204 to close valve 205 to thereby lock thermostat C in closed position. Thus, as soon as the outside atmospheric tempertaure has dropped sufficiently low so that normal ventilation will be able to maintain interior room conditions with low occupancy, the positive cooling coils in the recirculating passage are covered by their insulated damper, and at the same time the pressure fluid supply is also shut off from branch pipe 215. This permits valve 216 to open to again supply pressure fluid to thermostat V, which will immediately open damper 95' wide, provided the interior room temperature is 74° F. or above. The system may be so adjusted that with this condition, and with the fresh air damper wide open, room temperature can be maintained at 75° F. or below for a small occupancy. However, with large occupancy, or a number of lights or power sources of heat within the enclosure, the system may not be able to maintain 75° F. even with maximum ventilation of outside air which is slightly below 72° F. The interior temperature could then rise to 76° F. and above; but the cooling coils in the recirculating passage would not come into operation because the thermostat C is locked in closed position by the master thermostat D in the fresh air intake.

To provide against this contingency, the thermostat X, responsive to room temperatures, is set to function at 77° F., to supply pressure fluid through pipe line 210, which pressure opens valve 211 in by-pass 212, and allows the pressure fluid to enter pipe line 192 on the other side of valve 205, to thereby supply pressure fluid to thermostat C even though valve 205 is closed. An automatically opening by-pass around valve 205 is thus provided, so as to automatically bring thermostat C into operation to meet this contingency. When this occurs, the cooling coils in the recirculating passage will again be brought into operation, and at the same time valve 216 will be closed to lock thermostat V in "off" position which results in the return of damper 95' to its minimum setting. The positive cooling of the recirculated air will cause room temperature to rapidly drop below 77° F., when thermostat X again functions to terminate the supply of pressure fluid to line 210, and valve 211 will close. Thermostat C will again be locked in closed position and the cooling coils in the recirculating passage will be closed. This also closes off the supply of pressure fluid to branch 215, which permits valve 216 to open to again bring thermostat V into operation to open damper 95' toward wide open position. The system thus automatically functions to alternately try ventilative cooling and positive cooling, at the time when the outside atmospheric temperature is just below 72° F., or just below the interior room temperature to be maintained. If ventilative cooling proves insufficient to prevent rising room temperature, then the system automatically returns to positive cooling and at the same time materially reduces the quantity of outside fresh air introduced so as to cut down the load on the cooling coils, until room temperature is again brought back to proper conditions, when it again automatically returns to ventilative cooling and the cycle is repeated. This affords maximum of economy of operation, in that the system, without attention on the part of the operator, will utilize as far as possible the cooling effect of outside atmospheric air, whenever proper conditions of atmospheric air are available. When the outside atmospheric temperature drops further, the system will of course be able to maintain room conditions entirely by ventilative cooling, and thermostat V will function to gradually close damper 95' with lowering temperature so that the volume of introduced fresh air is maintained in a proportion which is coordinated with the interior heat load, so as to maintain the interior temperature conditions. Instead of providing a thermostat X in the by-pass, a manually operable control valve can be utilized, which can be positioned in the room at the control panel, so as to enable an operator to manually control the system when room temperature rises too high and thermostat C is locked in off position.

The humidity control in this form is regulated by the master hygrostat W in the fresh air intake. Whenever the humidity of the outside untreated air rises above 63° wet bulb, the hygrostat W functions to supply pressure air to pipe line 199 to' thereby close the by-pass around the dehumidifying unit in the common fresh air intake and to open the passageway so as to supply the fresh air across the dehumidifying and cooling mechanism. At the same time, refrigerating medium is supplied to the refrigerating coils of this mechanism, so that the incoming fresh air is dehumidified and cooled, say to saturated air at 45° F., as previously described. At the same time, pressure fluid is supplied through branch 200 to valve 201, which closes this valve and shuts off the supply of pressure fluid to thermostat V, thereby permitting damper 95' to move to its minimum setting. In this way, economy is effected, for as soon as the dehumidifying and cooling unit in the common fresh air intake is brought into operation, the dampers for the various rooms are immediately closed to their minimum settings to cut down the quantity of preconditioned fresh air supplied to the minimum amount required for ventilation.

When the humidity of the outside atmospheric air falls below 63° wet bulb, hygrostat W shuts off the supply of pressure fluid to pipe line 199, thereby reopening the dampers of the by-pass around the dehumidifying and cooling mechanism and closing the passageway across this mechanism, and at the same time shutting off the supply of refrigerating medium to the refrigerating coils of the dehumidifying mechanism. At the same time, valve 201 is permitted to reopen to unlock thermostat V, which then functions to control damper 95' in the manner previously described. For supplying additional moisture to make up for a reduced humidity condition of the outside fresh air, spray jets can be positioned within the recirculating passage, and actuated under the control of a hygrostat responsive to room humidity in the manner previously described.

While, in the foregoing explanation, the various room thermostats have been described as different mechanisms, that is, operated by different sensitive elements, it is to be understood that these mechanisms can be combined in a multiple thermostat actuated by a single sensitive element, as is well understood in this art. The one sensitive element then actuates the valve mechanisms of the different thermostats controlling their respective leak ports in a definite and predetermined sequence; and such a multiple thermostat construction provides for simple adjustment of the temperature range, while maintaining the constant differences and sequences in their operations.

While the methods herein described, and the forms of apparatus for carrying these methods into effect, constitute preferred embodiments of the invention, it is to be understood that the invention is not limited to these precise methods and forms of apparatus, and that changes may be made in either without departing from the scope of the invention which is defined in the appended claims.

What is claimed is:

1. The method in the conditioning of air for a plurality of rooms in a building, which comprises supplying from a common source fresh air from atmosphere to each room when the outside air is of an absolute humidity or total heat above predetermined values, dehumidifying said fresh air, withdrawing air from each room and returning withdrawn air to that particular room so that the withdrawn air from one room is prevented from returning to another room, exhausting to atmosphere from each room, and increasing the volume of dehumidified air supplied to each room upon an increase in the absolute humidity within the room.

2. The method in the conditioning of air for a plurality of rooms in a building, which comprises supplying from a common source fresh air from atmosphere to each room, withdrawing air from each room and returning withdrawn air to that particular room so that the withdrawn air from one room is prevented from returning to another room, exhausting to atmosphere from each room air in a proportion comparable to the amount of fresh air supplied to each said room, introducing fresh air into each room when the humidity and the total heat of said fresh air are lower than that desired for the room, and supplying the greater of the quantities of fresh air to each room as required to correct for temperature or humidity conditions within the room, to afford use of fresh atmospheric air whenever suitable for maintaining desired conditions in the room.

3. The method in the conditioning of air for a room, which comprises supplying fresh outside air from atmosphere to the room to mix with the air in the room, withdrawing mixed air from the room and conditioning withdrawn mixed air and returning the conditioned air to the room, controlling the introduction of outside air in response to an increase in either the temperature or humidity of the room air where the outside air has a humidity less than a predetermined value and has total heat less than a predetermined value, dehumidifying the outside air where the outside air has a humidity or a total heat above said respective predetermined values, introducing said dehumidified air into the room in accordance with an increase in the humidity of the room air, and compensating in the recirculating air for that condition which was not controlling upon the outside air.

4. The method in the conditioning of air for a room, which comprises supplying untreated fresh air from atmosphere to the room when the total latent and sensible heat and humidity of the outside atmospheric air is less than the total latent and sensible heat and humidity of predetermined conditions of the room air to be maintained, controlling the introduction of such untreated fresh air in accordance with air conditions within the room, supplying dehumidified fresh air from atmosphere to the room when the total latent and sensible heat or the humidity of the outside atmospheric air is greater than the predetermined conditions of room air to be maintained, and increasing the introduction of such dehumidified fresh air in accordance with an increase in humidity of the air within the room.

5. The method in the conditioning of air for a room, which comprises introducing dehumidified outside air in a predetermined small volume when the outside atmospheric air has a total latent and sensible heat greater than that of predetermined conditions of room air to be maintained, varying the quantity of such dehumidified outside air introduced into the room from zero to the predetermined small volume in accordance with the humidity load of the room, in order to maintain a predetermined humidity range of the air within the room, and correcting for any discrepancy of the temperature conditions to be maintained within the room by separately recirculating air away from and back to the room and conditioning the recirculated air.

6. The method in the conditioning of air for a room, which comprises introducing untreated outside fresh air into the room when the wet bulb temperature of the outside fresh air is less than a predetermined wet bulb-temperature of room air to be maintained and when the conditions of that air are such that the volume necessary to maintain humidity would result in a rise in temperature even though the dry bulb temperature of the untreated outside atmospheric air may exceed a predetermined dry bulb temperature of room air to be maintained, separately recirculating air away from and back to the room and spraying moisture into the air to cool the same by evaporative cooling, and increasing the volume of outside air introduced upon an increase in the temperature of the air in the room.

7. An air conditioning and ventilating system for a plurality of rooms, comprising in combination, a common fresh air intake, ducts for supplying fresh air from the said common intake to each of said rooms, recirculating passages for withdrawing air from and reintroducing it into each of said rooms, the air recirculated from one room being unmixed with air recirculated from another room, and means in each room for controlling the volume of outside air introduced into that room providing for an increase in the volume of such introduced air upon an increase in the humidity condition of the air in that room.

8. An air conditioning and ventilating system for a plurality of rooms, comprising in combination, a common fresh air intake, ducts for supplying fresh air from the said common intake to each of said rooms, separate and independent recirculating passages for withdrawing air from and reintroducing it into each of said rooms, the air recirculated from one room being unmixed with air recirculated from another room, ducts for exhausting to atmosphere air from each room, means for separately controlling the amount of fresh air introduced into each room and the amount of air exhausted therefrom, thermostatic and hygrometric mechanism responsive to air conditions in each room for automatically regulating the said controlling means for each said room, and additional thermostatic and hygrometric mechanism responsive to conditions of untreated outside atmospheric air for automatically modifying the action of said first mentioned thermostatic and hygrometric mechanism on said controlling means for each said room.

9. An air conditioning and ventilating system for a plurality of rooms, comprising in combination, a common fresh air intake, ducts for supplying fresh air from the said common intake to each of said rooms, separate and independent recirculating passages for withdrawing air from and reintroducing it into each of said rooms, the air recirculated from one room being unmixed with air recirculated from another room, means for exhausting to atmosphere air from each room, air conditioning mechanism in the recirculating passage for each room, independent air conditioning mechanism in said common fresh air intake, thermostatic and hygrometric mechanism responsive to air conditions in each room for automatically controlling the air conditioning mechanism in the recirculating passage for each said room, and thermostatic and hygrometric mechanism responsive to conditions of untreated outside atmospheric air for automatically controlling the air conditioning mechanism in said common fresh air intake.

10. An air conditioning and ventilating system for a plurality of rooms, comprising in combination, a common fresh air intake, ducts for supplying fresh air from the said common intake to each of said rooms, means for separately controlling the amount of fresh air introduced into each room and the amount of air exhausted therefrom, thermostatic and hygrometric mechanisms responsive to air conditions in each room for automatically regulating said controlling means for each said room, and thermostatic mechanism responsive to conditions of untreated outside atmospheric air interconnected with each of said first mentioned thermostatic and hygrometric mechanisms for automatically modifying the action thereof on the controlling means for the introduction of fresh air for each said room.

11. An air conditioning and ventilating system for an enclosure, comprising in combination, a fresh air intake for supplying fresh air to said enclosure, dehumidifying mechanism in said fresh air intake, thermostatic and hygrometric apparatus responsive to conditions of untreated outside fresh air for controlling said dehumidifying mechanism, a recirculating passage for withdrawing air from and returning it to said enclosure, heating means within said recirculating passage, cooling means within said recirculating passage, humidifying means within said recirculating passage, and additional thermostatic and hygrometric apparatus responsive to air conditions within the enclosure for selectively regulating said heating means, cooling means and humidifying means in the said recirculating passage.

12. An air conditioning and ventilating system for an enclosure, comprising in combination, a fresh air intake for supplying fresh air to said enclosure, means for controlling the amount of fresh air supplied to said enclosure, means responsive to humidity and temperature conditions within the enclosure for automatically regulating said controlling means, and additional means operable when the humidity or the total heat of the outside air exceed predetermined values for preventing control of the amount of fresh air supplied to the enclosure in response to the temperature of the air within the enclosure.

13. An air conditioning and ventilating system for an enclosure, comprising in combination, a fresh air intake for supplying fresh air to said enclosure, means for controlling the amount of fresh air supplied to said enclosure, means responsive to air conditions within the enclosure for automatically regulating said controlling means, additional control means for varying the minimum setting of said controlling means under the action of said automatic means to provide for a varying minimum of introduced fresh air in accordance with occupancy conditions within the enclosure, and additional means responsive to conditions of untreated outside atmospheric air for automatically returning said controlling means to its minimum setting when a predetermined condition of outside air is attained.

14. An air conditioning and ventilating system for an enclosure, comprising in combination, a fresh air intake for supplying fresh air to said enclosure, dehumidifying means within said fresh air intake, means controlling the amount of fresh air supplied to said enclosure, means responsive to air conditions within said enclosure for automatically regulating said controlling means to provide for increasing the quantity of fresh air supplied to the enclosure upon an increase in temperature or humidity of the air within said enclosure, and means responsive to conditions of untreated outside fresh air when its humidity or total heat is in excess of predetermined values for automatically initiating the action of said dehumidifying means upon the introduced fresh air.

15. In an air conditioning and ventilating system for an enclosure, an air passage, temperature conditioning means within said air passage, a heat insulated cover for enclosing said temperature conditioning means, and means for moving said cover and said conditioning means relatively to each other to expose a controlled portion of the temperature conditioning means to the air passing through said passage to regulate the temperature changing effect on said air.

16. An air conditioning and ventilating system for an enclosure comprising in combination, means for supplying air to the enclosure, means for controlling the amount of air thus supplied to the enclosure, means for heating air within the enclosure, means for cooling air within the enclosure, a thermostat responsive to air temperature within the enclosure for regulating said heating means, a thermostat responsive to air temperature within the enclosure for regulating said controlling means, and a thermostat responsive to air temperature within the enclosure for regulating said cooling means, said thermostats operating in succession in the order named on a progressively increasing temperature rise of air within the enclosure, an additional control means sensitive to predetermined outside air conditions for rendering nonresponsive said thermostat for regulating said controlling means.

17. An air conditioning and ventilating system for an enclosure, comprising in combination, a fresh air intake for supplying air to said enclosure, means for controlling the amount of fresh air supplied thereto, thermostatic means responsive to air conditions within the enclosure for regulating said controlling means, temperature changing means for the air within the enclosure, thermostatic means responsive to air conditions within the enclosure and functioning at a different air condition from that of said first mentioned thermostatic means for regulating the action of said temperature changing means, and an interconnection between said second mentioned thermostatic means and said first mentioned thermostatic means to modify the action of said first mentioned thermostatic means upon said controlling means for the amount of fresh air supplied to said enclosure when said second thermostatic means functions.

18. An air conditioning and ventilating system for an enclosure, comprising in combination, a fresh air intake for supplying fresh air to said enclosure, means for controlling the amount of fresh air supplied to said enclosure, thermostatic means responsive to air temperature within said enclosure for regulating said controlling means, positive cooling means for the air within said enclosure, a second thermostatic means responsive to temperature of the air within said enclosure and functioning at a higher temperature than said first mentioned thermostatic means to bring said positive cooling means into action, an interconnection between said second mentioned thermostatic means and said first mentioned thermostatic means to move said controlling means for the amount of fresh air introduced into the enclosure toward closing position when said second thermostatic means functions, a third thermostatic means responsive to the temperature of untreated outside fresh air and functioning when the temperature of such untreated outside fresh air drops to a predetermined degree below the room temperature to be maintained to lock the said second mentioned thermostatic means in off position to thereby terminate the action of said positive cooling means and to move the controlling means for the amount of fresh air toward open position, and a fourth thermostatic means responsive to the temperature of air within the enclosure and functioning at a still higher temperature than that of said second thermostatic means for automatically restoring the said second thermostatic means to normal operation unmodified by said third thermostatic means to again bring into operation said positive cooling means and to move the controlling means for the amount of fresh air introduced toward closing position, said fourth thermostatic means remaining in operation until the temperature of air within said enclosure falls below its predetermined operating temperature to thereby control the system to automatically and alternately try ventilative cooling and positive cooling until the temperature of the untreated outside fresh air falls sufficiently low to maintain desired room temperature by ventilative cooling irrespective of the heat load within the enclosure.

19. An air conditioning and ventilating system of the character described comprising means for supplying outside air from atmosphere to a room to mix with the air in the room, means for withdrawing mixed air from the room, means for conditioning withdrawn mixed air and returning the conditioned air to the room, means for controlling the introduction of outside air in response to an increase in either the temperature or humidity of the room air where the outside air has a humidity and total heat less than predetermined respective conditions with reference to corresponding conditions of room air, means for dehumidifying the outside air, means for initiating operation of said dehumidifying means when the outside air has a humidity or total heat above said predetermined respective conditions, means for introducing said dehumidified air into the room in accordance with increase in the humidity of the room air, and means for controlling the conditioning means for the withdrawn air to provide compensation in said withdrawn air for that condition which was not controlling upon the outside air.

CHARLES F. BEELER.